(12) United States Patent
Davies et al.

(10) Patent No.: US 8,571,031 B2
(45) Date of Patent: Oct. 29, 2013

(54) CONFIGURABLE FRAME PROCESSING PIPELINE IN A PACKET SWITCH

(75) Inventors: Michael Davies, Santa Monica, CA (US); Robert Southworth, Chatsworth, CA (US)

(73) Assignee: Intel Corporation, Santa Clara, CA (US)

( * ) Notice: Subject to any disclaimer, the term of this patent is extended or adjusted under 35 U.S.C. 154(b) by 760 days.

(21) Appl. No.: 12/575,175

(22) Filed: Oct. 7, 2009

(65) Prior Publication Data

US 2011/0080916 A1    Apr. 7, 2011

(51) Int. Cl.
*H04L 12/28* (2006.01)
*H04L 12/56* (2011.01)

(52) U.S. Cl.
USPC ............ 370/392; 370/389; 370/401; 370/469

(58) Field of Classification Search
None
See application file for complete search history.

(56) References Cited

U.S. PATENT DOCUMENTS

| | | |
|---|---|---|
| 2002/0196769 A1 | 12/2002 | Ohmi et al. |
| 2003/0021266 A1 | 1/2003 | Oki et al. |
| 2005/0135399 A1 | 6/2005 | Baden et al. |
| 2006/0106976 A1 * | 5/2006 | Michael ........................ 711/108 |
| 2007/0195777 A1 | 8/2007 | Tatar et al. |
| 2007/0195778 A1 * | 8/2007 | Tatar et al. .................... 370/392 |

OTHER PUBLICATIONS

International Search Report and Written Opinion dated Jun. 15, 2011, PCT Application No. PCT/US2010/051676.
"International Preliminary Report on Patentability for International Patent Application No. PCT/US2010/051676, dated Apr. 11, 2012", Whole Document.

* cited by examiner

*Primary Examiner* — Jae Y Lee
(74) *Attorney, Agent, or Firm* — Blakely, Sokoloff, Taylor & Zafman LLP

(57) ABSTRACT

Highly configurable frame processing pipelines are enabled in packet switches in an efficient manner which satisfies stringent area and power requirements. Frame processing pipelines are described that enable dynamic processing of different types of frames on a per frame basis.

12 Claims, 12 Drawing Sheets

US 8,571,031 B2

CONFIGURABLE FRAME PROCESSING PIPELINE IN A PACKET SWITCH

BACKGROUND OF THE INVENTION

The present invention relates to packet switches and, in particular, to configurable frame processing pipelines in packet switches.

Packet switches are the building blocks for many network devices and switch fabric architectures, receiving data frames on ingress ports, temporarily storing the frames in a shared memory or datapath crossbar, and transmitting each frame on one or more egress ports. Some packet switches implement only very basic functionality, e.g., simple forwarding of received frames, while others provide relatively more sophisticated frame processing capabilities, e.g., implementing the terms of a service level agreement.

Regardless of the level of sophistication, packet switches typically include a resource that determines how each frame should be handled with reference to information stored in the frame header, i.e., a frame processing pipeline. Conventionally, frame processing pipelines are implemented as complex, but relatively static, functions that perform predetermined, fixed logical operations on frame header data. This conventional approach makes it difficult implement a switch that dynamically handles different types of data frames. In addition, the static nature of such designs presents significant obstacles to fixing bugs or updating designs to incorporate new functionality, often requiring significant redesign.

SUMMARY OF THE INVENTION

According to one class of embodiments, a packet switch is provided that includes a multi-ported switch datapath. A plurality of ingress ports receives incoming data frames. Ingress interconnection circuitry selectively connects the ingress ports to the switch datapath. A plurality of egress ports transmits outgoing data frames. Egress interconnection circuitry selectively connects the egress ports to the switch datapath. Control circuitry controls operation of the ingress and egress interconnection circuitry and the switch datapath to facilitate writing the incoming data frames to the switch datapath and reading the outgoing data frames from the switch datapath. Frame processing pipeline circuitry determines forwarding behavior for and modifications to apply to each of the incoming frames with reference to incoming header data associated with the incoming data frames. The frame processing pipeline circuitry also generates outgoing header data for association with the outgoing data frames. The frame processing pipeline circuitry includes a plurality of pipeline stages. The pipeline stages include parsing circuitry configured to vector portions of the incoming header data into data fields in a data fields channel. Selected ones of the pipeline stages include a programmable structure configured to dynamically select one or more operands from the data fields channel and one or more operations to perform using the one or more operands. Selection of the one or more operands and the one or more operations is done with reference to one or more keys derived from the data fields channel on a per frame basis. The pipeline stages further including modify circuitry configured to generate the outgoing header data with reference to the data fields channel.

According to another class of embodiments, switch fabrics configured to interconnect a plurality of computing devices are provided that include a plurality of interconnected packet switches, at least some of which are implemented in accordance with the invention.

According to yet another class of embodiments, a network processing device for use in a multi-chip switch system that includes a central switch fabric is provided. The network processing device is configured for deployment between the central switch fabric and an external device configured to transmit and receive frames of data to and from the central switch fabric via the network processing device. The network processing device includes a pipelined circuit configured to operate on data fields in a data fields channel to determine forwarding behavior for and modifications to apply to the frames of data corresponding to the data fields in the data fields channel. The pipelined circuit includes a plurality of pipeline stages. Selected ones of the pipeline stages include a programmable structure configured to dynamically select one or more operands from the data fields channel and one or more operations to perform using the one or more operands. Selection of the one or more operands and the one or more operations is done with reference to one or more keys derived from the data fields channel.

A further understanding of the nature and advantages of the present invention may be realized by reference to the remaining portions of the specification and the drawings.

DETAILED DESCRIPTION OF SPECIFIC EMBODIMENTS

Figure 1:
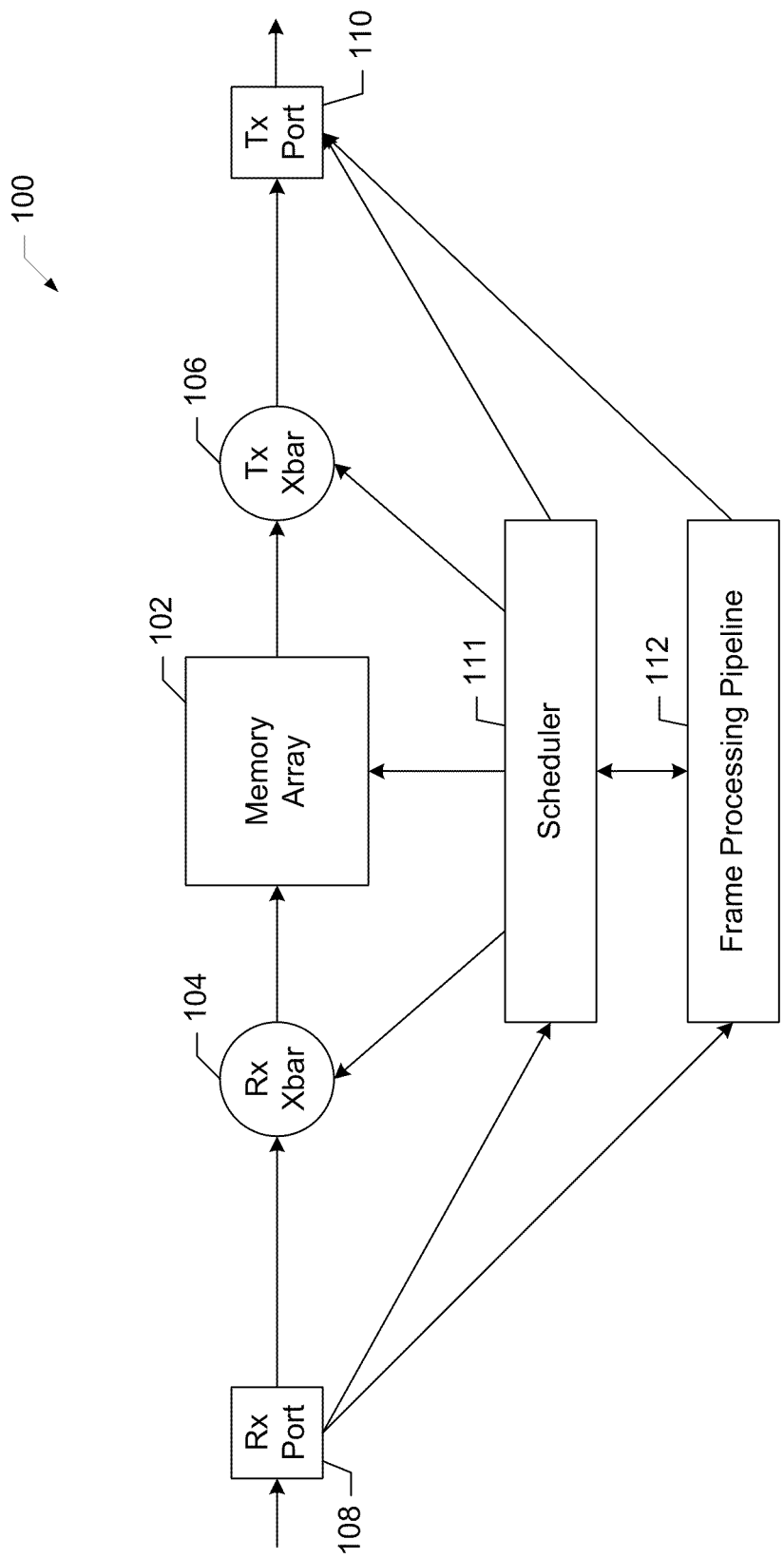
FIG. 1 is a diagram of a shared memory switch that may be implemented in accordance with various embodiments of the invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to various embodiments of the invention, highly configurable frame processing pipelines are enabled in high-performance packet switches. In such switch architectures, the frame processing pipeline (FPP) is a centralized processing resource which is responsible for parsing, classifying, and modifying the packet headers associated with each frame handled by the switch, and providing the necessary forwarding and quality-of-service (QoS) directives to the switch datapath. Pipelines designed in accordance with such embodiments employ programmable circuit structures that enable this configurability in an efficient manner which satisfies stringent area and power requirements. In contrast with previous architectures that implement relatively static pipelines with little or no configurability, embodiments of the invention employ a generalizable, highly configurable approach for implementing frame processing functionality. Frame processing pipelines implemented in accordance with such embodiments can perform the same basic functions as previous pipelines, but much of the underlying hardware is more generic so that the behavior of the pipeline is easier to adapt to changing requirements. In addition, troubleshooting and the fixing of bugs is greatly facilitated. According to specific embodiments, the configurability of frame processing pipelines enables dynamic processing of different types of frames by the same circuits on a per frame basis.

It should be noted that the terms "frame" and "packet" may be used interchangeably in that both are standard terms referring to the basic units of data transfer in various protocols (e.g., Ethernet, IP, Fibre Channel, Fibre Channel over Ethernet, InfiniBand, etc.) with which embodiments of the present invention may be employed. It should also be noted that reference to particular types of frames or packets and/or specific data transmission or network communication protocols is provided by way of example, and is not intended to limit the scope of the invention. Rather, those of skill in the art will appreciate the broad applicability of the configurable circuit structures and pipelines enabled by the present invention.

FIG. 1 shows a shared memory switch implemented in accordance with a specific embodiment of the invention. Shared memory switch 100 has a shared memory 102, ingress and egress crossbars 104 and 106 connecting ingress and egress ports 108 and 110 to memory 102, and a scheduler 111 that controls the crossbars and the memory. Frame processing pipeline (FPP) 112 parses incoming frames and performs the header calculations that determine how the frame is handled. A frame (e.g., an Ethernet frame) comes into the switch and the port logic replicates the header and sends it to FPP 112. The logic in the FPP determines the set of egress port(s) to which the frame is to be forwarded, what modifications to apply to its Layer 2-4 header fields, and any quality-of-service directives supported by the switch scheduler 111.

Embodiments of the invention provide targeted programmability to the FPP by exploiting at least some of the following salient properties common to such processing stages over a wide variety of packet switching applications:

Very little frame-to-frame state. The great majority of computation applied to each frame depends only on the specific data fields contained within each frame and not on the history of past frames handled by the device.

Restricted formats of headers. Although the frame lengths that a switch must handle are typically variable and may be very large (10 KB or more), the packet header formats and associated processing requirements are far less variable. Since packet headers, by definition, are located at the beginning of each data frame, the FPP need only process some fixed maximum number of initial bytes of each frame, typically no more than 64-128 bytes. Furthermore, only a specific subset of the bytes in each header is of relevance to the FPP computation.

Repeated stages of classification followed by field modification. The general pattern of computation that arises in most frame processing pipelines is one or more stages of header classification followed by data field modification rules that are dependent on the classification results. For example, the frame parsing that occurs at the beginning of the pipeline follows this pattern, as does the final egress header field modification stage, as well as various intermediate address lookup stages.

Restricted set of frame profiles that a particular switch instance must support. A given switch instance need only support a limited number of frame types as identified by their protocol or as classified by specific header fields dependent on the protocol. The specific frame types that must be supported depend on several factors:
  Generic properties of the application context. For example, an Ethernet switch deployed in a Layer 2 network might need to support all standard Ethernet forwarding functionality (flooding, learning, etc.) but may not require any processing of higher-layer header protocols or an awareness of other Layer 2 protocols.
  Specific instance-dependent properties. For example, an IP router must identify frames to be routed based on a specific test of each frame's Layer 2 destination address against a single router address configured for that instance.
  Role within a particular network deployment. For example, in a provider backbone network, the switches at the network edge may need to recognize a wide variety of packet types and support methods for encapsulation and decapsulation of those packets, whereas switches deployed in the interior of such a network need only support the more restricted set of encapsulated frame types.

Each different category of frames that a particular switch must handle, along with the category's associated processing rules, is referred to as a frame profile. The more profiles that a given switch device supports, the more application contexts into which the switch can be deployed. Given the rising VLSI semiconductor fabrication costs in processes supporting ever-increasing port speed and integration requirements, it therefore becomes increasingly important for a single switch device to support a wide range of frame profiles without requiring per-application design customization.

Figure 2:
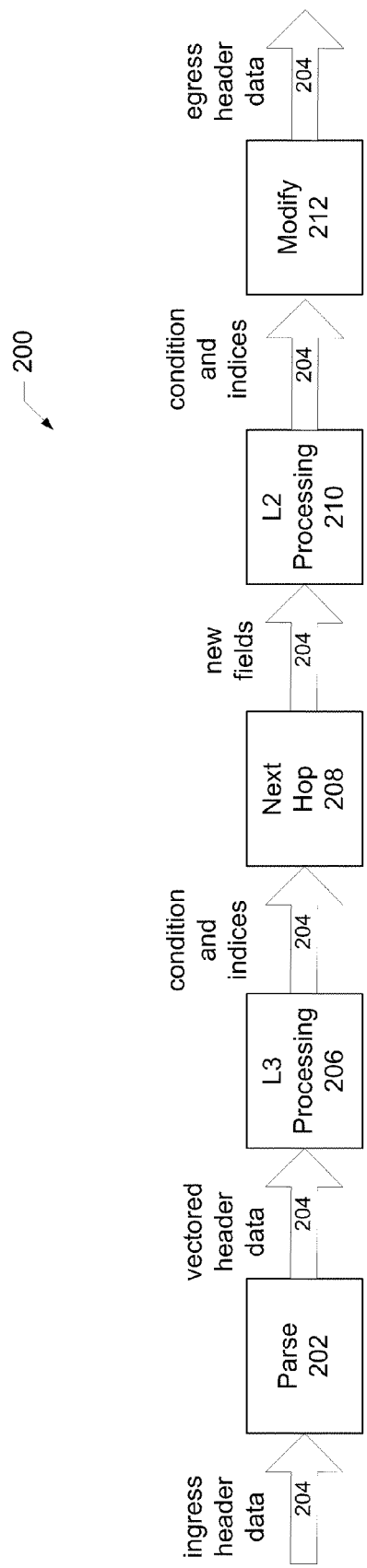
FIG. 2 is a diagram of an example of a frame processing pipeline that may be implemented in accordance with various embodiments of the invention.

A high-level illustration of an FPP that may be implemented in accordance with embodiments of the invention is provided in FIG. 2 which provides a conceptual depiction of some common, high-level FPP functions in a Layer 2/3 router device, each of which may be implemented (to one degree or another) using the configurable circuit structures described herein. FPP 200 includes a parser 202 which receives the frame header, identifies the various frame header data fields, and vectors the header data into various positions in a data fields channel 204 of the FPP. As will be discussed, the data fields channel includes the data on which the various downstream pipeline stages operate, as well as the control and/or index information provided to those downstream stages.

The fact that frame formats are fundamentally variable makes the parsing function challenging in that the relevant information for each of these fields may be in different locations in successive packets. As will be discussed, the configurability of FPPs designed in accordance with embodiments of the present invention meet this challenge effectively by enabling dynamic processing of different types of frames on a per frame basis.

A Layer 3 lookup 206 receives input in the form of the header data vectored into predetermined positions in data fields channel 204. These vectored data may be thought of as an n-tuple comprising n fields. The resulting output is a set of conditions, and a set of indices for use by subsequent stages in the pipeline. As will be discussed below, lookup 206 is an associative lookup (which may comprise n stages of associative lookup) in that the input data map to location(s) in one or more associated tables.

"Next Hop" stage 208 employs a routing index from the associative lookup to identify a new set of fields representing the next routing "hop" for the frame being processed. The new set of fields are then applied in an associative lookup in the next pipeline stage, i.e., MAC stage 210. MAC stage 210 is a Layer 2 associative lookup stage which results in another set of forwarding conditions and indices for the final Modify stage 212 which modifies the data in data fields channel 204 to result in a new header for the frame reflecting the new source and destination addresses. Modify stage 212 essentially performs the inverse operation of parser 202, i.e., it takes the data fields in the data fields channel and determines how to pack those fields into the outgoing packet header at variable locations (depending on the frame or packet type).

It will be understood that the diagram of FIG. 2 and the foregoing description is a simplified representation of an FPP showing only some of the basic functionality for illustrative purposes, and that different levels of granularity would show fewer or more stages and/or functions. More generally, and regardless of the particular functionality, an FPP designed in accordance with the present invention typically has multiple instances of an n-tuple associative lookup(s) followed by direct-mapped table lookups using the indices from the associative lookup(s). In addition, it will also be understood that each of the stages shown in FIG. 2 may be implemented as one or more stages, each of which may be pipelined to satisfy the frame processing throughput requirements of the switch, and at least some of these stages will employ the circuit structures described herein. Examples of some of the basic programmable circuit structures implementing such functionality are provided below.

A general technique for implementing an iterative algorithm (e.g., such as the functionalities of an FPP) to achieve higher throughput is to "unroll" the algorithm, and to pipeline each iteration as a discrete stage of logic. However, such an approach is not always practical. For example, if one were to attempt to do this with a general purpose CPU, the implementation would be impracticably large in terms of chip area. On the other hand, and according to specific embodiments of the invention, by carefully selecting particular functions performed in an FPP for implementation in this manner, a highly configurable FPP may be implemented that satisfies both throughput and area constraints. In the paragraphs that follow, an exemplary design analysis process is described that leads to the circuit implementations associated with embodiments of the invention. Such circuit implementations satisfy the requirements of a wide range of frame processing profiles while preserving a suitable degree of programmability, yet offer efficient circuit implementations in terms of area, power, and performance.

Figure 3:
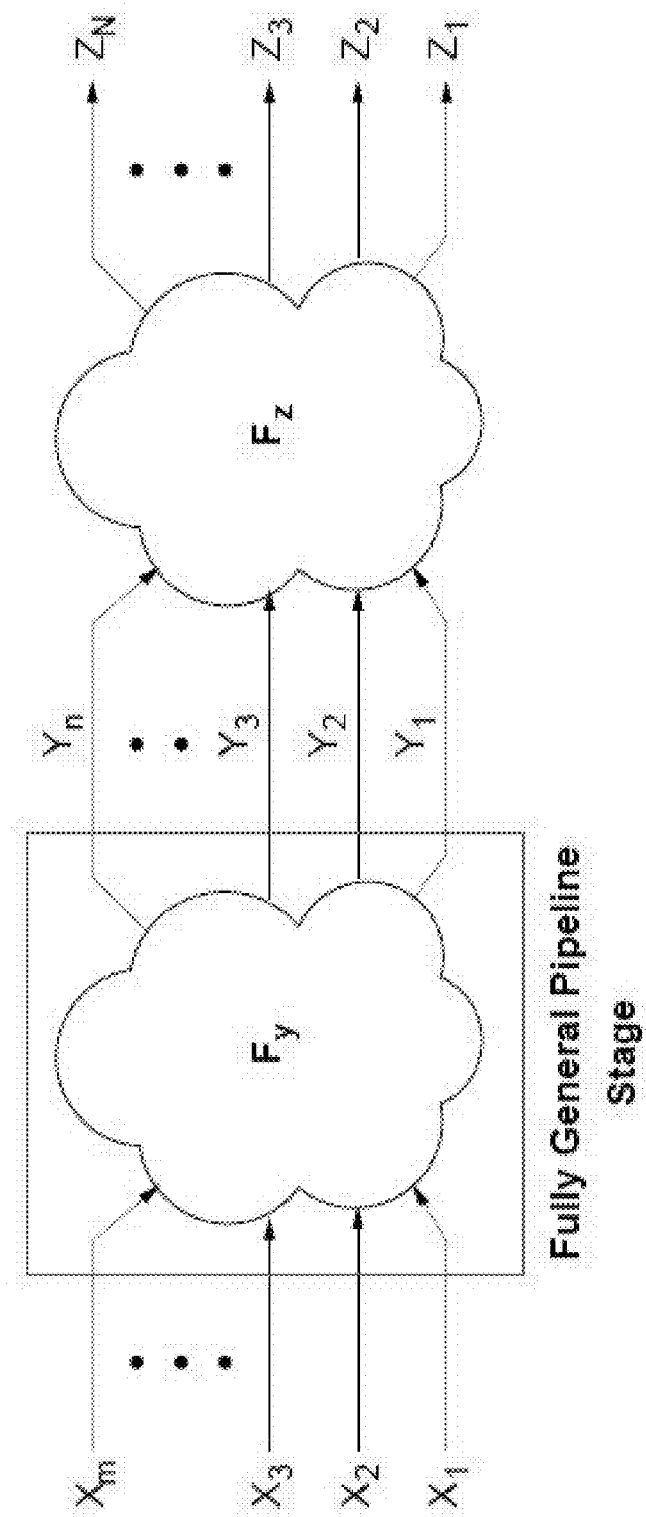
FIG. 3 illustrates a generalized representation of a stage of frame processing pipeline computation.

The most general representation of a stage of FPP computation is illustrated in FIG. 3. A set of data fields $\{X_1, X_2, \ldots X_m\}$, $\{Y_1, Y_2, \ldots Y_n\}$, etc. is transformed from one stage to the next. The total aggregate bit width of these fields may vary from stage to stage, but remains less than some maximum value imposed by implementation efficiency considerations (typically on the order of the maximum number of frame header fields that must be processed over all profiles). The operation of each computation stage can be expressed mathematically as a system $F_y$ of functions:

$$Y_1 = F_1(X_1, X_2, \ldots X_m)$$

$$Y_2 = F_2(X_1, X_2, \ldots X_m)$$

$$\ldots$$

$$Y_n = F_n(X_1, X_2, \ldots X_m)$$

Each of these functions $F_i$ may be implemented in a fully-general, fully-programmable manner as a table lookup mapping the input m-tuple $(X_1, X_2, \ldots X_m)$ to each output value $Y_i$. Such a table $T_i(X_1, X_2, \ldots X_m)$ contains $2^{\Sigma_i |X_i|}$ entries of width $|Y_i|$ each. For small aggregate bit widths $\Sigma_i |X_i|$ and $\Sigma_i |Y_i|$ (on the order of 16), general direct-mapped table lookups, e.g. implemented as a static random-access memory (SRAM), provide a very reasonable and maximally configurable implementation. However, for switches implementing processing profiles of practical interest, these bit sums reach thousands of bits and therefore may not be implemented so simply.

Fortunately, the frame processing profiles of practical interest require nowhere near this degree of generality. According to the present invention, a number of general properties may be exploited to partition and simplify this fully-general representation leading to an implementable architecture that preserves sufficient programmability to span a wide range of frame profiles.

First, many FPP stages may be partitioned into one or more sub-stages that operate on a specific subset of input and output data fields. For example, a Layer 2 address lookup stage requires only as many input bits as the maximum lookup key requires over all applications and need only produce a relatively small set of outputs representing a specific set of physical ports and associated handling directives. Both input and output bit widths can be very reasonably bounded to values much smaller than the total aggregate bit width of all fields passing through that stage of the pipeline.

Figure 4:
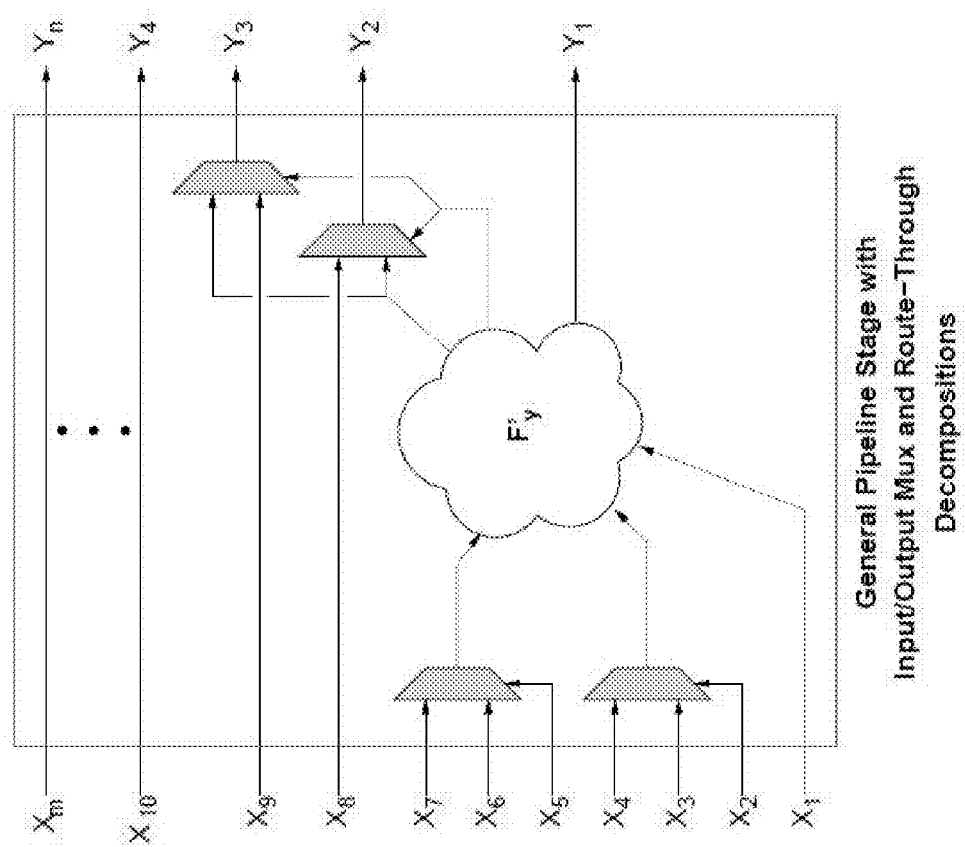
FIG. 4 illustrates a computation structure that refines the representation of FIG. 3 in accordance with specific embodiments of the invention.

Second, it is very common for one or more inputs to a particular FPP computation to be used symmetrically but mutually exclusively with another set of inputs. The selection of which input set to use may be an output of some prior processing stage, typically a function of the specific processing profile to be applied to the frame. This property motivates a multiplexor ("mux") decomposition at the input of such stages. Oftentimes a symmetric decomposition may be applied to the outputs of such stages, with one of a number of specific output fields to be modified selected by a profile-dependent data field generated by that stage. The computation structure that results from these simplifications is illustrated in FIG. 4. Note that the resulting structure comprises wires and muxes, which are both extremely cheap to implement, and a generic function $F'_y$ that has far fewer input and output bits than the original function $F_y$. If these reduced numbers of input and output bits are sufficiently small, then the fully general table lookup implementation may now be applied.

For many processing stages, $F'_y$ remains too complex to admit a simple table lookup implementation. The next common property that can be exploited is the guarded, priority-encoded nature of each computation stage. Specifically, many $F'_y$ comprise a function $F''_y$ with a specific number of variations, or cases, selected by an if-then-else construct. In pseudocode form, a wide range of profiles may match the following:

```
IF (g₁(X₁, X₂, ...Xₘ)) THEN
    case := 1
ELSE IF (g₂(X₁, X₂, ...Xₘ)) THEN
    case := 2
ELSE IF ...
ELSE
    case := k
```

Each guard function $g_j(X_1, X_2, \ldots X_m)$ may commonly be represented as a disjunction (OR) of conjunctive (ANDed) exact-match tests of profile-dependent bit slices of the input fields $\{X_i\}$. For example, an IP router's Layer 2 DMAC assignment stage may require the following guards:

```
IF (ValidRoute==1 ∧ Mcast==0 ∧ (EtherType==(IPv4 ∨
EtherType==(IPv6)))
    case := 1   Look up and reassign DMAC based on matching routing
                rule
ELSE
    case := 0   Leave DMAC as-is
```

The "ValidRoute" and "Mcast" bits are conditions computed at earlier stages in the pipeline, and the "EtherType" variable is a 16-bit header field identified by the parsing stage and mapped to some specific data field. In a programmable FPP, these fields may be encoded in any number of specific data field bits according to profile configuration. Thus the generic representation of the guard in the above pseudocode might be $$X_1[0]==1 \wedge X_1[4]==0 \wedge (X_3[15:0]==(IPv4) \vee X_3[15:0]==(IPv6))$$

(where $X_i[n]$ and $X_i[n:m]$ notation represents, respectively, bit n of field $X_i$ and bit slice n:m of field $X_i$.) A very large space of such generic guards may be implemented efficiently and programmably with a ternary content addressable memory (TCAM), followed by a priority hit detect stage, followed by a table lookup (RAM) indexed by the hit detect output. The input bit width of the TCAM may be quite large (e.g. 100 bits or more), but as long as the number of entries can be kept small (on the order of 32), the size and power of the TCAM and RAM remain acceptably low. The number of entries (or rules) corresponds to the sum of the maximum number of disjunctive terms over all guards of all profiles to be supported. As the example above suggests (which requires only three rules), a number on the order of 32 does commonly provide ample flexibility to encode a wide variety of processing profiles. A computation structure refined to include this input TCAM classification stage is provided in FIG. 5.

Figure 5:
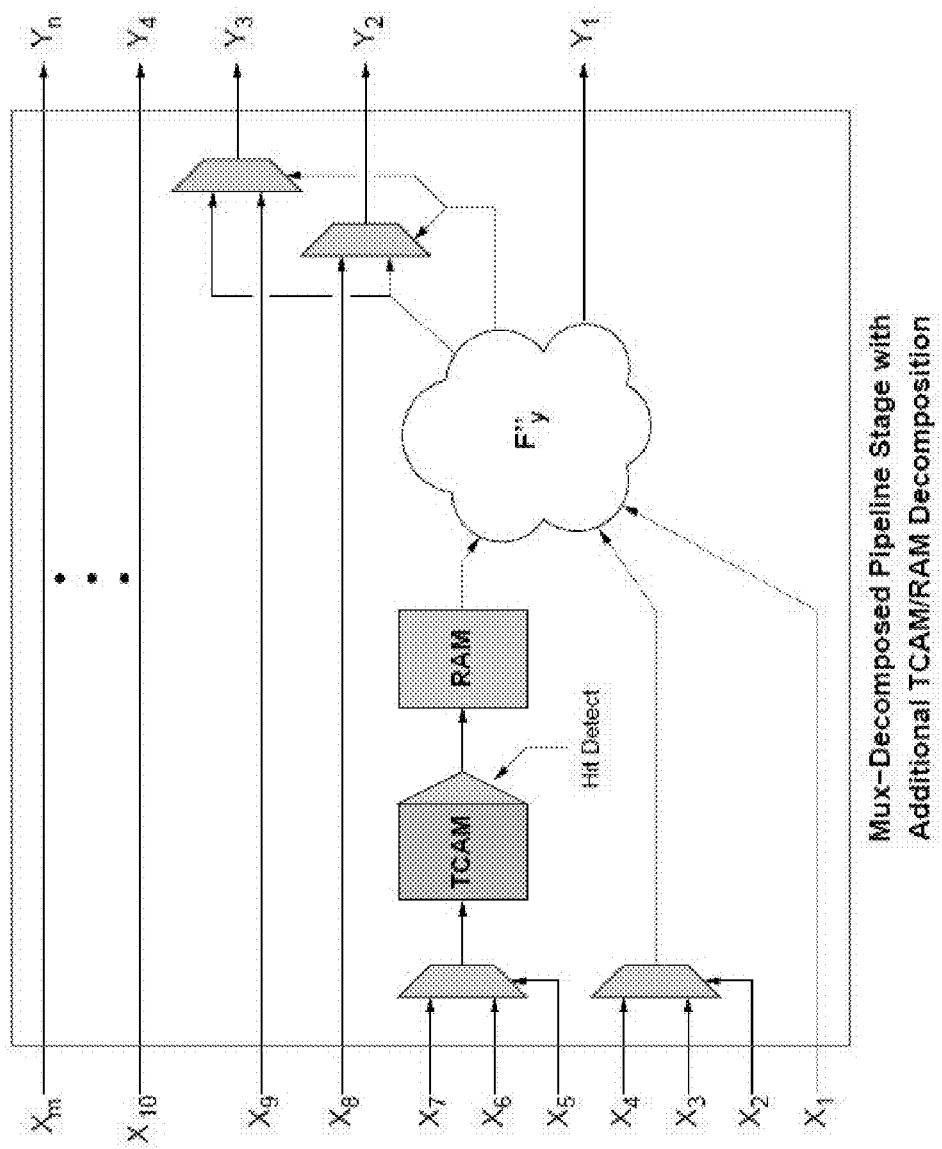
FIG. 5 illustrates a computation structure that further refines the representation of FIG. 3 in accordance with specific embodiments of the invention.

After applying the transformations described above, the final computation kernel $F''_y$ in FIG. 5 represents the processing function, or action, applied by the stage. In some cases, the function may be implemented fully generically as a RAM table lookup. Even when this is not possible, the above transformations surround the fixed-function kernel with sufficient configurable circuitry to allow the action to be applied in a wide variety of profile-dependent manners. For example, $F''_y$ may be an associative Layer 2 MAC address lookup table. Depending on the profile configuration, the same lookup table resource may be configured to implement a destination MAC lookup, a source MAC lookup, a lookup of these fields from an inner encapsulated frame, or the lookup of a next hop DMAC address as assigned by an earlier stage. Furthermore, the output bits of the table lookup may be left up to programmable interpretation. Depending on the configuration of downstream FPP stages, they may be interpreted as indices for subsequent forwarding table lookups, tags for network statistics monitoring, bits encoding security handling cases, etc.

In addition to providing each individual stage with a great deal of useful programmability, the transformation techniques described above provide a secondary and equally valuable "cross-product" of programmable flexibility. For example, suppose one processing stage, so transformed, provides the flexibility to associate a 10-bit tag field with a number of frame header fields, such as its Layer 2 DMAC address, its outer VLAN ID, its inner VLAN ID, or its Layer 4 destination port, and further suppose that a downstream stage so transformed provides 1,024 entries that may be individually configured to either police or count the frames mapped to each policer/counter by a selection of multiplexed 10-bit tags. The cross-product of this configurability now provides the overall FPP with a large number of new features, such as counting by outer VLAN, policing by Layer 4 destination port, etc. Moreover, these features may be enabled on a per-switch-instance, per-profile, or per-frame basis.

Figure 6:
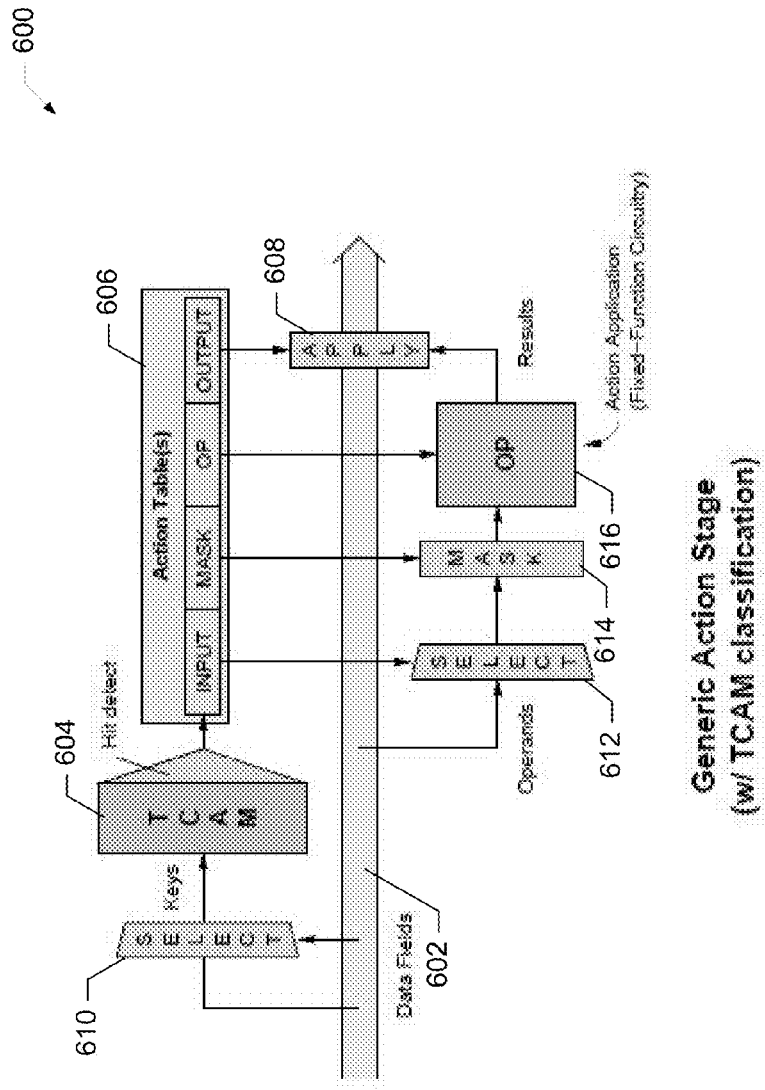
FIG. 6 is a block diagram of a configurable frame processing pipeline stage according to a specific embodiment of the invention.

FIG. 6 shows a generalized example of programmable circuit structure 600, also referred to herein as an "action stage," variations of which are employed as the basic building blocks of the various stages of a dynamically configurable FPP designed in accordance with specific embodiments of the invention. Data fields channel 602 represents fixed data transmission resources on the chip, e.g., actual conductor carrying bits of information. One approach would be to send the entire packet header through every stage of the pipeline. However, such an approach would require a high number of bits to be processed every stage which may not be practical to implement. Therefore, according to various embodiments of the invention, the number of bits processed at each stage is reduced to a manageable number of bits, and that total bit width is maintained through the pipeline. This is accomplished by each stage determining which of the bits in the data fields channel no longer need to be processed, and overwriting them. As the header data in these fields 602 progress down the pipeline, some of the bits may correspond to derived fields while others correspond to literal header data. Depending on the implementation, these latter bits may persist as literal header data, or may be overwritten with the data of intermediate terms. In the context of an FPP, the data fields channel begins as the literal fields of the ingress packet header and, over time, gets overwritten in various pipeline stages to represent various intermediate states of the header data, ultimately getting mapped to forwarding directives needed by the switch scheduler and to the appropriate egress packet header values.

An associative lookup mechanism 604 receives input keys and provides input to one or more Action Tables 606 that each represent a specification for how to transform the data in data fields channel 602 (e.g., via Apply block 608). In the example shown in FIG. 6, the input keys are derived from data in the data fields channel. However, as will be discussed, variations in this regard are contemplated. Associative lookup 604 may be thought of as a frame classification which, according to a particular class of embodiments, is implemented as a ternary content-addressable memory (TCAM). It should be noted that in some applications, simpler circuit implementations, such as a binary content-addressable memory, may suffice.

This is to be contrasted with conventional approaches in which a lookup may be performed to identify some value which has a static relationship to a specific operation to be performed. According to various embodiments of the invention, the data derived from the associative lookup (e.g., the TCAM) is used to dynamically select which of the data from the data fields channel to manipulate, and how to manipulate that data on a per frame basis. Such flexibility enables, for example, a single pipeline circuit structure to process different types of frames (e.g., Fibre Channel vs. IP) differently as they are encountered in real time.

Data from the data fields channel are used as the keys to the associative lookup, e.g., as the TCAM input. According to some embodiments, these data may be dynamically selected (Select 610). According to other embodiments, data from a preceding stage and/or the data fields channel itself may be used to select which data are used as keys to the TCAM. According to some implementations, the data from the data fields channel that are used as the keys for the associative lookup (for a current or succeeding stage) may be hardwired. As yet another alternative, some combination of these approaches may provide varying levels of configurability in this regard.

The results of the associative lookup are used by Action Table 606 to determine (Input table to Select block 612) from which of the data in the data fields channel the input operand(s) for the stage will be derived. Action Table 606 may also be configured to specify a masking function (Mask table to Mask block 614) to determine which bits of the input operand(s) are to be masked or otherwise modified, i.e., further selection of the input operand(s). This may involve, for example, the specification of particular bit values directly from the Mask table in Action Table 606.

The resulting operand(s) are provided as input to some operation (Op table to OP block 616) which might involve, for example, yet another table or TCAM lookup, application of a logical function (e.g., a hash, a checksum, or a logical or arithmetic operation), or any of a variety of alternatives.

Rather than the conventional approach of hard coding at each stage of an FPP which results from the previous stage are visible and used by that stage, the visibility and use of results from a previous stage are dynamically configured on a per frame basis. Conventional approaches commit such decisions to fixed hardware circuitry at the design stage. By contrast, embodiments of the invention not only allow modifications to the programming of each stage, but allow dynamic configurability of individual pipeline stages during operation.

Figure 7:
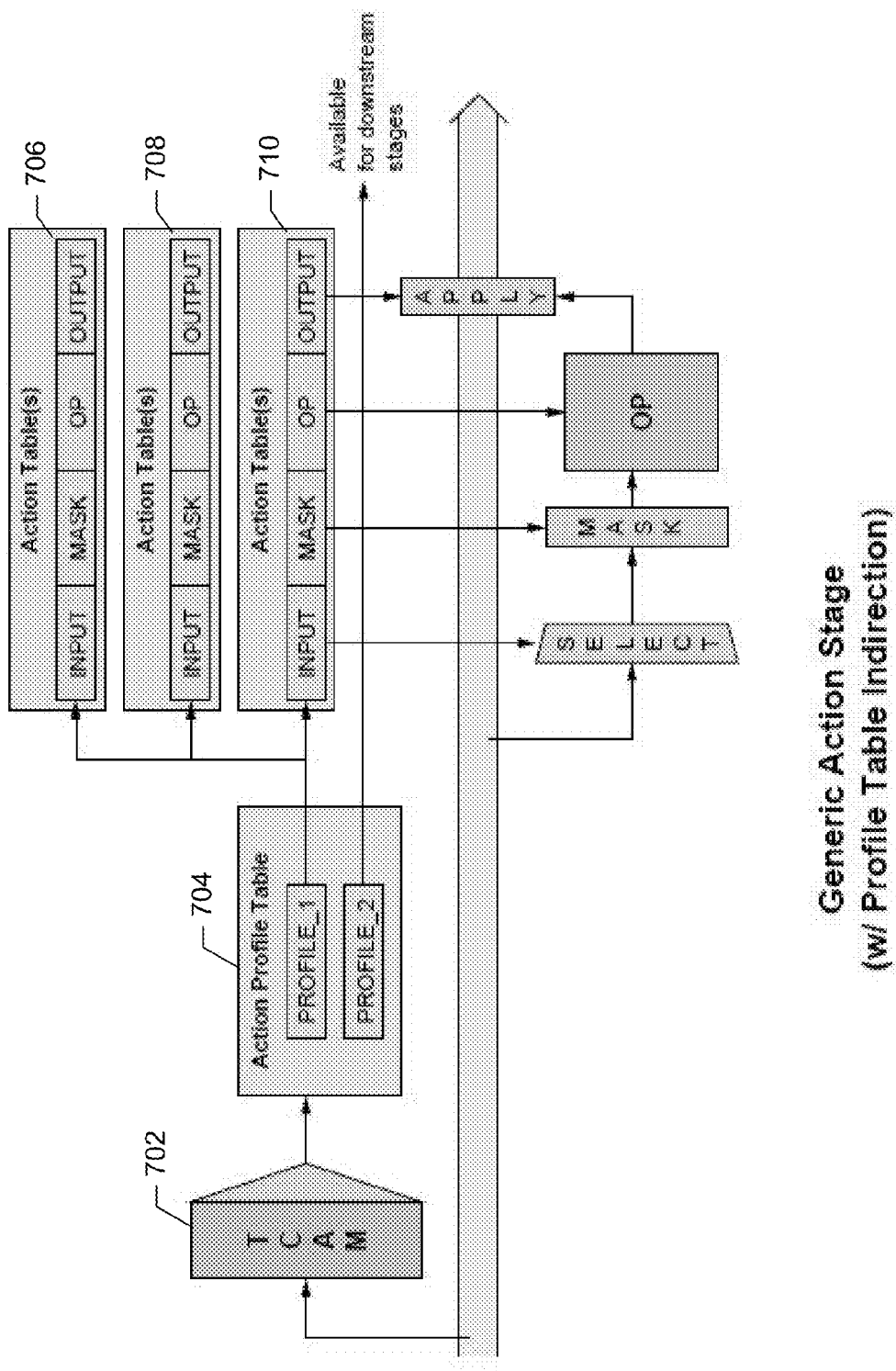
FIG. 7 is a block diagram of a configurable frame processing pipeline stage according to another specific embodiment of the invention.

An associative lookup mechanism, e.g., a TCAM, is typically a relatively high power structure that consumes nontrivial area resources. Therefore, according to some embodiments, a level of indirection may be introduced in the form of "profile indices" to reduce or mitigate such overhead. According to such embodiments, and as illustrated in FIG. 7, the TCAM 702 specifies one or more profiles of possible action operations to apply. This effectively is a compression in which TCAM 702, by the indirection of an Action Profile Table 704, specifies a profile number, which is then used to index into Action Tables 706-710.

Figure 8:
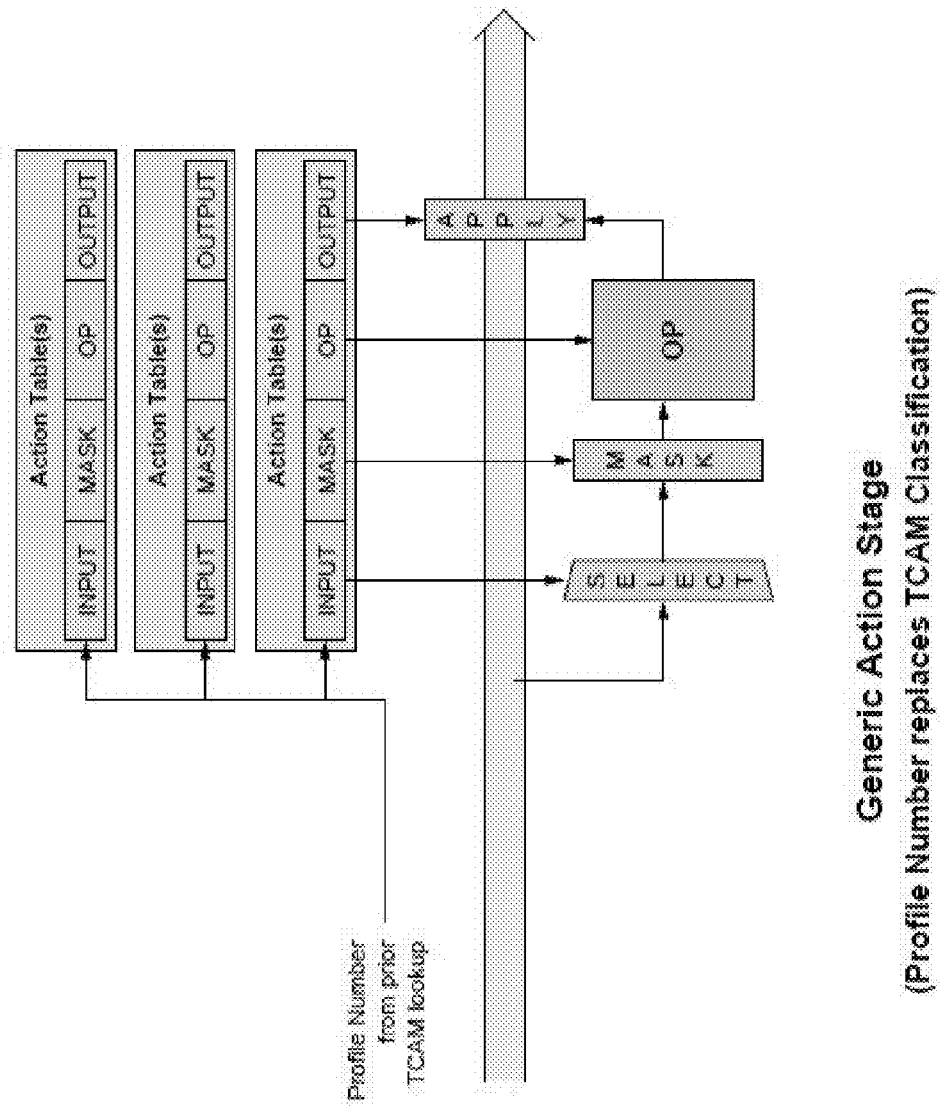
FIG. 8 is a block diagram of a configurable frame processing pipeline stage according to yet another specific embodiment of the invention.

According to some embodiments, and as illustrated in both FIG. 7 and FIG. 8, selected profiles may persist and be employed by subsequent pipeline stages. This reduces or even eliminates the need for associative lookup resources in downstream stages. Alternatively, even where the compression represented by the use of profiles is not used, the results of an associative lookup (e.g., by a TCAM) from one stage may be employed by one or more subsequent stages to have a similar effect in terms of the reduction in required resources.

Figure 9:
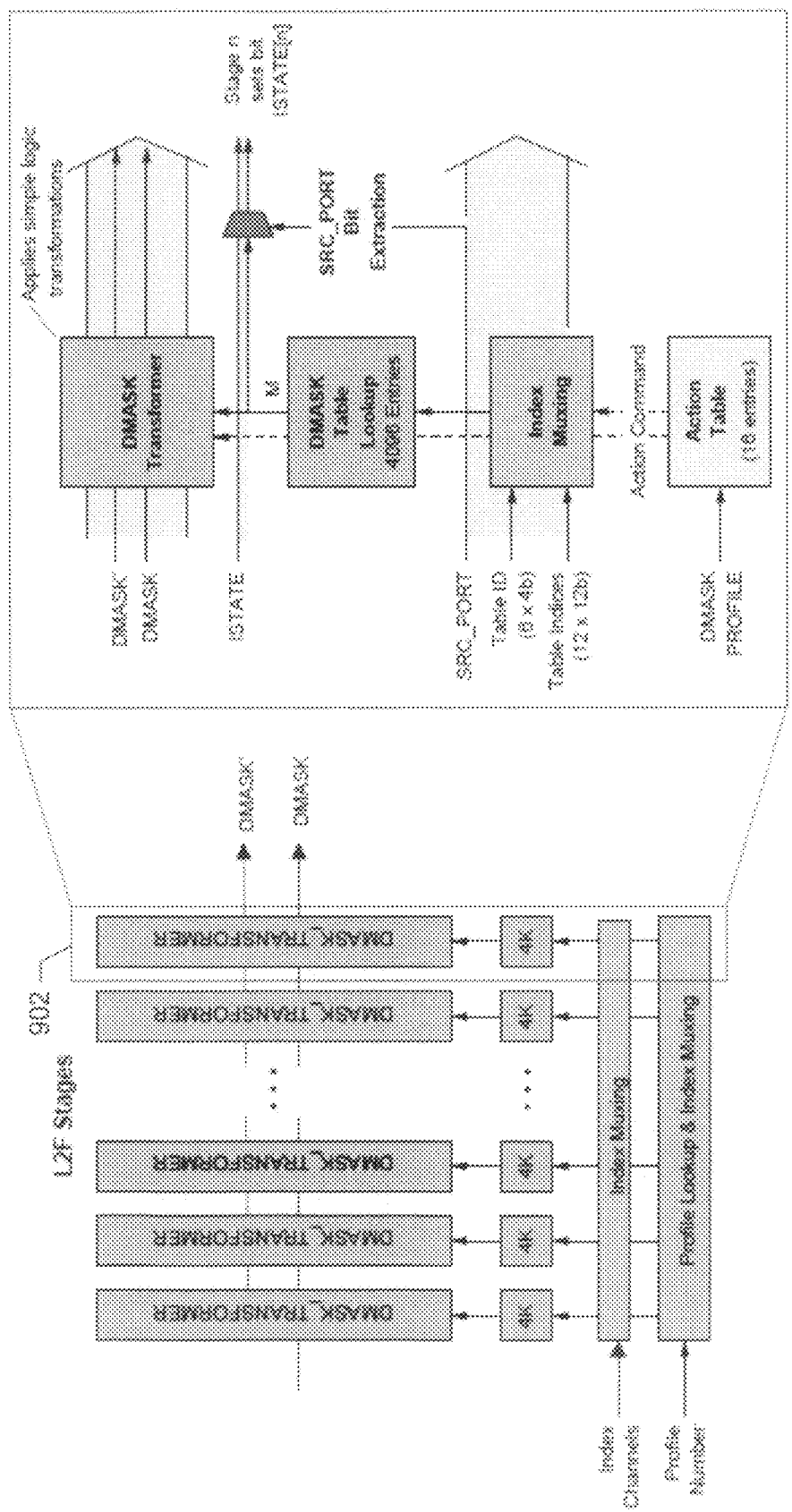
FIG. 9 is a block diagram of a configurable frame processing pipeline stage configured to implement Layer 2 frame processing according to a more specific embodiment of the invention.

An example of a particular context in which various of the functionalities and structures discussed above may be employed is in a multi-stage destination mask transformation (e.g., as might be implemented in an L2 processing block) as illustrated in FIG. 9. Each DMASK transformation stage 902 has the basic structure shown at the right which is characterized by the programmability and dynamic configurability described above with reference to the more generic structures of FIGS. 6-8. In this example, a single profile index is determined by an earlier TCAM lookup (not shown) and is shared among all DMASK stages, with the specific actions for each stage mapped from its Action Table. The "OP" action transformation in this example is a 4096-entry lookup table followed by a functional block that transforms the DMASK channel based on the action configuration and the result of the table lookup. Basic logical operations, such as AND and OR, are supported. By selecting the specific data field encoding the frame's 12-bit egress VLAN ID as the table index and an "AND" logical operation, for example, one of these stages can be configured to implement VLAN membership filtering, a fundamental feature of a Layer 2 switch.

An even more flexible architecture would include a TCAM lookup in each stage, allowing the profile index of one stage to be mapped independently of the others. However, in the specific application of Ethernet switching, such an enhanced degree of flexibility is not commonly necessary and therefore may not justify the cost of additional TCAMs.

Figure 10:
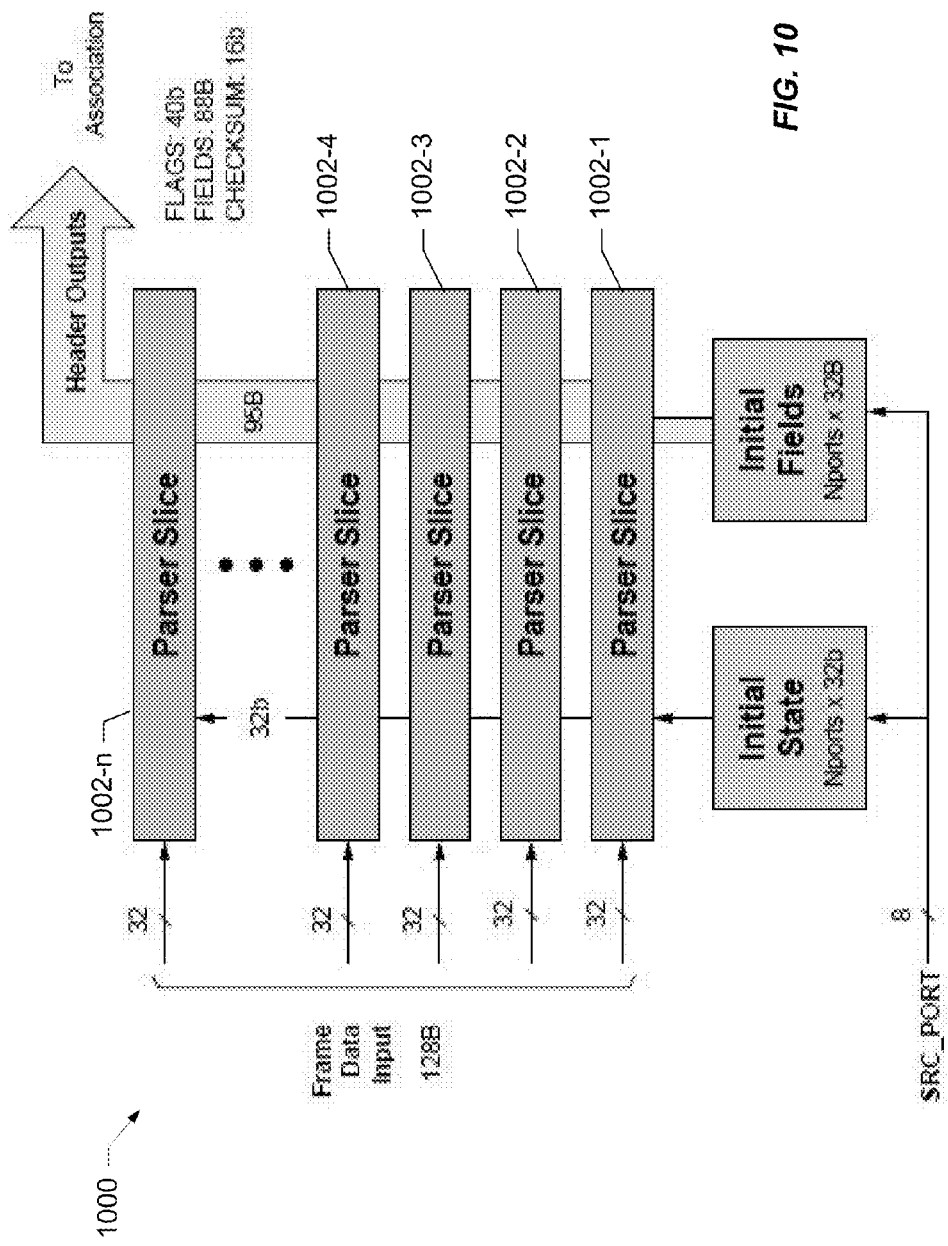
FIG. 10 is a block diagram of a configurable frame parser according to a specific embodiment of the invention
Figure 11:
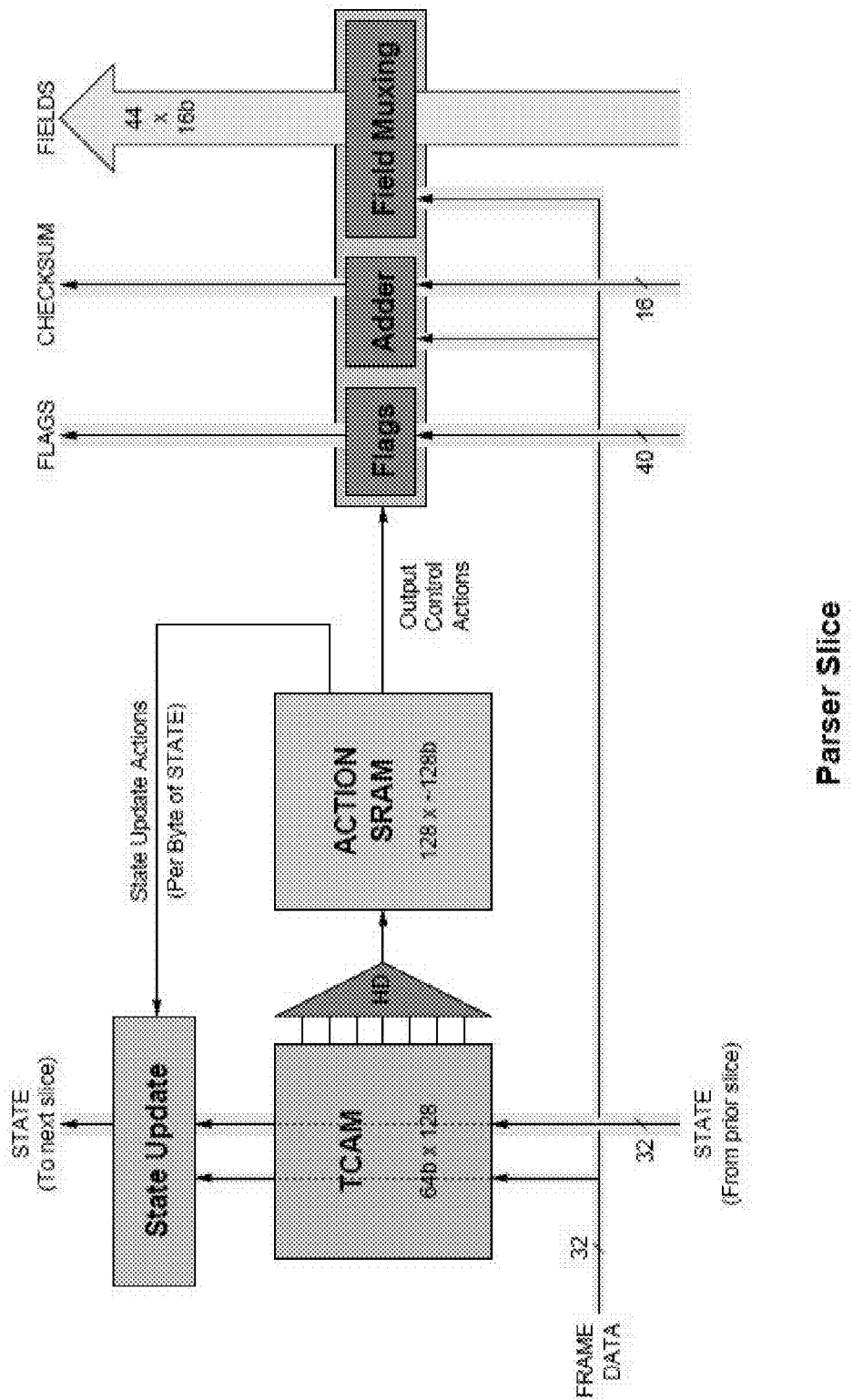
FIG. 11 is a block diagram of a portion of the parser of FIG. 10.

A representation of a specific implementation of a configurable parser 1000 for use in configurable FPPs designed in accordance with various embodiments of the invention is shown in FIG. 10. Each parser slice or stage 1002 is a specific implementation of at least one of the generic structures of FIGS. 6-8 and operates on some subset of the bits of frame header data. An example of a particular implementation of a parser slice is shown in FIG. 11. In this structure, the set of constant-width fields modified by each slice are divided into two categories: (1) fields directly assigned or derived from the input frame data (labeled "FLAGS", "CHECKSUM", and "FIELDS"), and (2) temporary data fields used to communicate parsing state from slice to slice (labeled "STATE"). The FLAGS field comprises a collection of bits that the Action SRAM may set individually in order to communicate properties of interest to later stages of the FPP (e.g. if the frame has an IPv4 header). The CHECKSUM field is the result of a one's complement adder used for verifying the header checksum contained within Layer 3 or Layer 4 packet headers. The FIELDS data bytes are directly assigned from header fields of interest, e.g. from a six-byte Layer 2 destination MAC address or a 16-byte IPv6 source address. The STATE output of the depicted stage is transformed according to one of a handful of operations, as selected by the Action RAM, and becomes part of the key for the TCAM lookup 804 in the following stage. The one's complement adder is the only component of the depicted structure which has a fixed definition motivated by the specific requirements of the Layer 3-4 protocols to be supported. Otherwise, all circuit components are fully generic. As a result, a parser so implemented can be configured to process a diverse set of widely used packet protocol headers (e.g. IEEE 802.3 Ethernet, IPv4, IPv6, TCP, UDP, FCoE) as well as any number of other protocols not yet defined or standardized.

Figure 12:
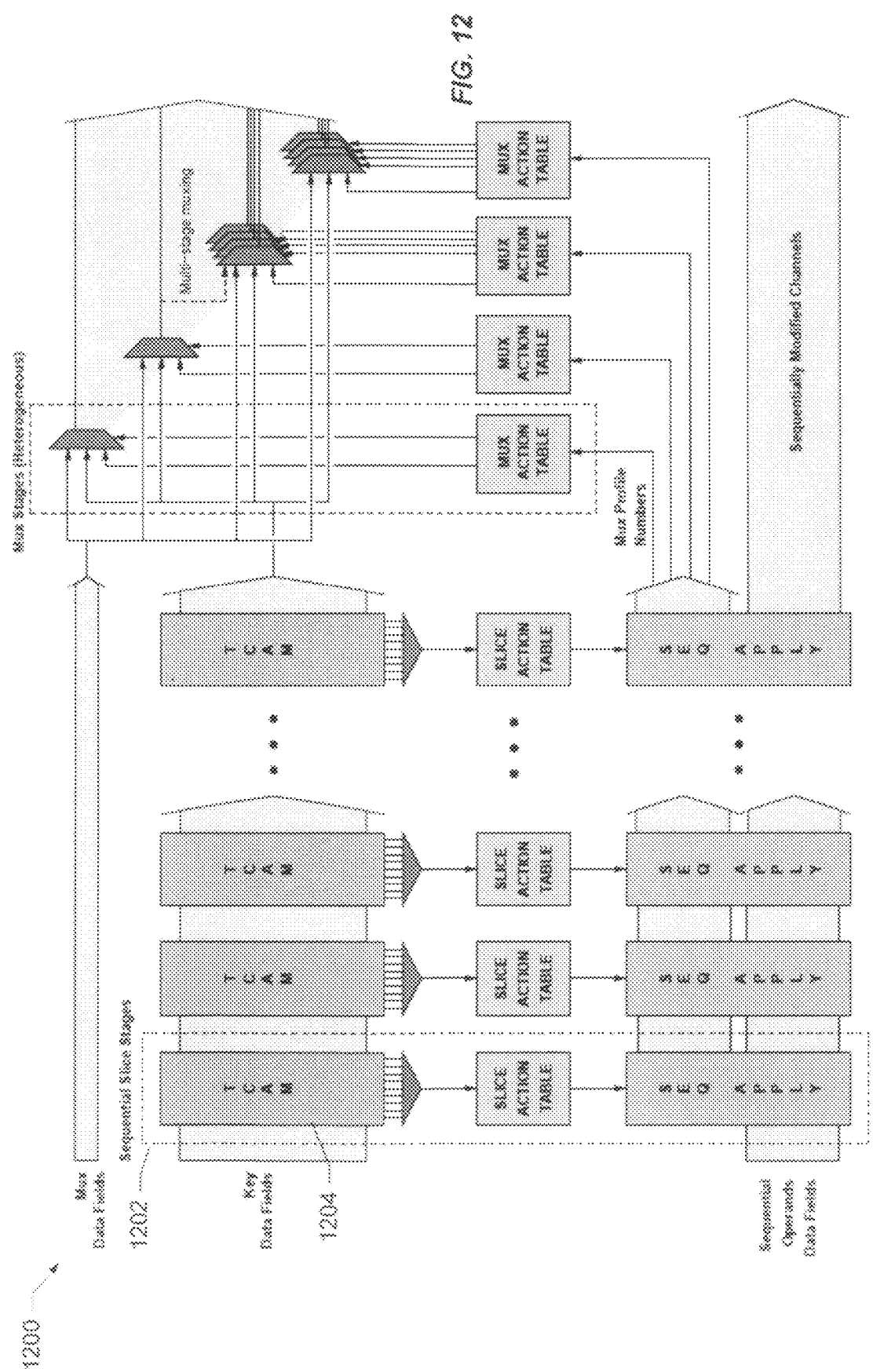
FIG. 12 is a block diagram of a configurable action resolution pipeline stage according to a specific embodiment of the invention.

A representation of a specific implementation of a configurable Action Resolution stage 1200 for use in configurable FPPs designed in accordance with various embodiments of the invention is shown in FIG. 12. The depicted Action Resolution stage may be employed at various locations in a configurable FPP where architecturally significant processing decisions are made. It may be regarded as a scaled-up version of the structure of FIG. 6, suitable for the comprehensive reassignment of large numbers of data fields in response to configurable conditions evaluated over a large number of classification and lookup inputs generated by earlier stages. One example application of such a stage in an IP router FPP falls after the Access Control List (ACL) and next hop routing table classification stages and immediately before the Layer 2 MAC address lookup table. Although each ACL and routing lookup stage may follow the structures of FIGS. 6-8, thus providing a large degree of profile-dependent programmability, for efficiency reasons many of those stages might produce their outputs independently of each other. The Layer 2 destination MAC lookup that follows these stages is fundamentally dependent on the Layer 3 next hop routing decision, so some configurable stage must resolve the necessary data dependencies (namely, in this example, the next hop DMAC and VLAN fields) with an awareness of all earlier classification and lookup results.

Each Action Resolution slice 1202 is a specific implementation of at least one of the generic structures of FIGS. 6-8. The slices sequentially modify the data in the data fields channel which are then mapped back to the data fields channel via the output channel multiplexing. As shown, the operation of each stage of the output channel multiplexing is governed by configurable profiles (e.g., as described above with reference to FIG. 7) which are selected by profile indices generated by the slices. The mux action tables shown in FIG. 12 map the profile indices to multiplexor control values for a specific set of multiplexors. The mux action tables may also provide profile-dependent constant values that override the output data fields when selected by certain multiplexor control cases. For extra flexibility, the tables may specify these constants as (mask,value)-pairs which serve to restrict the multiplexing to the specific masked bits of the output data fields, with the unmasked bits assigned from the constant value. It should be noted that embodiments of the present invention are contemplated in which the output channel multiplexing may be generalized to a logical transformation structure in which the multiplexors are replaced by logical transformation circuits or blocks configured to apply any of a wide variety of logical transformations of their input data fields as configured by the control values generated by the associated profile tables.

In the depicted implementation, the same key is applied to each of the associative lookups (i.e., e.g., TCAM 1204) in each stage, but the lookups themselves are not iterative in that the results of the lookup in any given stage are not visible or available as a key to subsequent stages. However, as can be seen, the sequential transformation of the data fields channel at the bottom of the depicted structure are iterative in that one stage's transformation is visible to the following stage.

The output channel multiplexing stages may follow major architectural lookup and classification operations for the purpose of determining how the results of some number of prior lookup and classification stages are applied to the frame. That is, the output channel multiplexing stages determine how to modify or overwrite the data fields in the data field channel given the results of the lookup operations performed by the Action Resolution slices. Often, these major lookup and classification stages produce a large number of data fields with complex inter-dependencies in their interpretation. The Action Resolution slices process these inter-dependencies and specify the appropriate multiplexing for these fields. Effectively, an Action Resolution stage implements a major decision point in the pipeline in which a large number of data fields are transformed together. Were it not for Action Resolution stages, the derived classification and lookup fields would successively accumulate, demanding increasingly expensive routing and operand multiplexing resources in downstream FPP stages.

An example of the operation of such an Action Resolution stage is in the context of Layer 3 frame processing in a router which may involve, for example, replacing the source and destination MAC addresses and potentially the VLAN tags in a frame header based on a destination address lookup. After performing all of the relevant lookups and getting the required values, it is the Action Resolution stage that provides the logic to effect the actual replacement of corresponding fields in the data field channel which are then used by the subsequent Layer 2 address lookup and Modify stages of the FPP to construct the frame header.

Various embodiments of the present invention provide FPPs which allow significant programmability in functionalities beyond the various table lookups, e.g., functionalities relating to the transformation of header data to vectored fields (which are used in lookups to generate conditions), and the use of conditions to effect the transformation back to header data. As discussed above, traditional general purpose CPUs are not suitable to implement such programmability in an FPP context in that they are iterative (i.e., slow). Field Programmable Gate Array (FPGA) technology is another implementation option which offers even more configurability than a general purpose CPU while maintaining high performance, but an FPGA implementation of any real-world FPP of interest suffers from impracticably high area and power requirements. Also, unless it were to employ circuit structures similar to those enabled by embodiments of the present invention, an FPGA implementation would not provide much support for dynamic frame profile-dependent processing. At the other end of the spectrum, conventional FPP implementations (e.g., fully integrated ASICs which implement a static state machine that perform fixed functions on packets) have very little configurability.

FPPs implemented in accordance with specific embodiments of the invention provide significant programmability and are capable of providing frame processing at full line rate on a per frame basis. FPPs designed in accordance with embodiments of the invention can operate like ASIC state machines in that they perform pipelined, pre-planned discrete operations on the packet header. However, embodiments of the invention provide circuit structures and an architecture which enable efficient implementation of such operations while still allowing them to be programmable. Therefore they may span a much wider range of functional behavior than that of a fixed-function ASIC while delivering comparable levels of performance and cost.

While the invention has been particularly shown and described with reference to specific embodiments thereof, it will be understood by those skilled in the art that changes in the form and details of the disclosed embodiments may be made without departing from the spirit or scope of the invention. For example, the functionalities described herein may be implemented in a wide variety of contexts using a wide variety of technologies without departing from the scope of the invention. That is, embodiments of the invention may be implemented in processes and circuits which, in turn, may be represented (without limitation) in software (object code or machine code), in varying stages of compilation, as one or more netlists, in a simulation language, in a hardware description language, by a set of semiconductor processing masks, and as partially or completely realized semiconductor devices. The various alternatives for each of the foregoing as understood by those of skill in the art are also within the scope of the invention. For example, the various types of computer-readable media, software languages (e.g., Verilog, VHDL), simulatable representations (e.g., SPICE netlist), semiconductor processes (e.g., CMOS, GaAs, SiGe, etc.), and device types (e.g., frame switches) suitable for designing and manufacturing the processes and circuits described herein are within the scope of the invention.

Embodiments of the invention are described herein with reference to packet or frame switching devices. According to such embodiments and as described above, some or all of the functionalities described may be implemented in the hardware of highly-integrated semiconductor devices, e.g., 1-Gigabit and 10-Gigabit Ethernet switches, various switch system switches, and similar devices. In addition, references herein to shared memory switches are merely by way of example. Those of skill in the art will understand that the present invention applies more generally to a wider variety of packet or frame switching devices.

In another example, embodiments of the invention might include multi-chip switch systems in which an FPP implemented according to the invention might replace one or more discrete network processor (NPU) devices (also known as "traffic managers") connected between each port's PHY device and the central switch fabric (which, in such systems, does not typically perform any protocol-specific frame header processing). An FPP implemented as described herein may be configured to provide an efficient, programmable implementation for some or all of the functionality in such devices.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A packet switch, comprising:
a multi-ported switch datapath;
a plurality of ingress ports for receiving incoming data frames;
ingress interconnection circuitry configured to selectively connect each of the ingress ports to the switch datapath;
a plurality of egress ports for transmitting outgoing data frames;
egress interconnection circuitry configured to selectively connect each of the egress ports to the switch datapath;
control circuitry configured to control operation of the ingress and egress interconnection circuitry and the switch datapath to facilitate writing the incoming data frames to the switch datapath and reading the outgoing data frames from the switch datapath; and
frame processing pipeline circuitry configured to determine forwarding behavior for and modifications to apply to each of the incoming frames with reference to incoming header data associated with the incoming data frames, and to generate outgoing header data for association with the outgoing data frames, the frame processing pipeline circuitry comprising:
parsing circuitry configured to vector portions of the incoming header data into data fields in a data fields channel; and
a plurality of programmable structures in sequence with one another along the data fields channel, wherein, for each programmable structure of the plurality of programmable structures:
the programmable structure to receive a respective set of frame header fields of the data fields channel, the programmable structure including:
key selection logic to dynamically select a key from the respective set of frame header fields;
a ternary content addressable memory (TCAM), wherein the programmable structure to perform an associative lookup of the TCAM based on the key to determine an index;
an action table comprising a plurality of configurable profiles each including an input field, a mask field, an operation field, and an output field, wherein the programmable structure to select, based on the index, a first profile of the plurality of configurable profiles;
the programmable structure to generate a first operand in response to selection of the first profile, including:
the programmable structure to dynamically select, based on the input field of the first profile, input data from the respective set of frame header fields; and
the programmable structure to mask a portion of the input data based on the mask field of the first profile;
the programmable structure to perform with the first operand a first operation according to the operation field of the first profile, and the programmable structure to transform data in the data fields channel based on a result of the operation and according to the output field of the first profile.

2. The packet switch of claim 1, wherein the plurality of programmable structures includes a first programmable structure and a second programmable structure, and wherein the first programmable structure is configured to employ one or more indices from the second programmable structure.

3. The packet switch of claim 1 wherein one or more of the plurality of programmable structures are each configured to overwrite profile indices and data field outputs received from a respective immediately preceding programmable structure.

4. The packet switch of claim 1, wherein for each programmable structure of the plurality of programmable structures:
the programmable structure to transform data in the data fields channel based on the result of the operation and according to the output field of the profile includes the programmable structure to multiplex the result of the operation into the data fields channel according to the output field of the profile.

5. The packet switch of claim 1, further comprising:
multiplexor stages to receive profile indices from the plurality of programmable structures and to perform multiplex operations based on the profile indices, including the multiplexor stages to multiplex into the data field channel a result of a lookup operation performed by the plurality of programmable structures.

6. A network processing device for use in a multi-chip switch system that includes a central switch fabric, the network processing device being configured for deployment between the central switch fabric and an external device configured to transmit and receive frames of data to and from the central switch fabric via the network processing device, the network processing device comprising:

a pipelined circuit configured to operate on data fields in a data fields channel to determine forwarding behavior for and modifications to apply to the frames of data corresponding to the data fields in the data fields channel, the pipelined circuit comprising:

parsing circuitry configured to vector portions of incoming header data into data fields in a data fields channel; and a plurality of programmable structures in sequence with one another along the data fields channel, wherein, for each programmable structure of the plurality of programmable structures:

the programmable structure to receive a respective set of frame header fields of the data fields channel, the programmable structure including:

key selection logic to dynamically select a key from the respective set of frame header fields;

a ternary content addressable memory (TCAM), wherein the programmable structure to perform an associative lookup of the TCAM based on the key to determine an index;

an action table comprising a plurality of configurable profiles each including an input field, a mask field, an operation field, and an output field, wherein the programmable structure to select, based on the index, a first profile of the plurality of configurable profiles;

the programmable structure to generate a first operand in response to selection of the first profile, including:

the programmable structure to dynamically select, based on the input field of the first profile, input data from the respective set of frame header fields; and the programmable structure to mask a portion of the input data based on the mask field of the first profile;

the programmable structure to perform with the first operand a first operation according to the operation field of the first profile, and the programmable structure to transform data in the data fields channel based on a result of the operation and according to the output field of the first profile.

7. The network processing device of claim 6, wherein the plurality of programmable structures includes a first programmable structure and a second programmable structure, and wherein the first programmable structure is configured to employ one or more indices from the second programmable structure.

8. The network processing device of claim 6, wherein for each programmable structure of the plurality of programmable structures:

the programmable structure to transform data in the data fields channel based on the result of the operation and according to the output field of the profile includes the programmable structure to multiplex the result of the operation into the data fields channel according to the output field of the profile.

9. The network processing device of claim 6, further comprising:

multiplexor stages to receive profile indices from the plurality of programmable structures and to perform multiplex operations based on the profile indices, including the multiplexor stages to multiplex into the data field channel a result of a lookup operation performed by the plurality of programmable structures.

10. A switch fabric configured to interconnect a plurality of computing devices, the switch fabric comprising a plurality of interconnected packet switches, one or more of the packet switches comprising:

a switch datapath;

a plurality of ingress ports for receiving incoming data frames;

ingress interconnection circuitry configured to selectively connect each of the ingress ports to the switch datapath;

a plurality of egress ports for transmitting outgoing data frames;

egress interconnection circuitry configured to selectively connect each of the egress ports to the switch datapath;

control circuitry configured to control operation of the ingress and egress interconnection circuitry and the switch datapath to facilitate writing the incoming data frames to the switch datapath and reading the outgoing data frames from the switch datapath; and frame processing pipeline circuitry configured to determine forwarding behavior for and modifications to apply to each of the incoming frames with reference to incoming header data associated with the incoming data frames, and to generate outgoing header data for association with the outgoing data frames, the frame processing pipeline circuitry comprising:

parsing circuitry configured to vector portions of the incoming header data into data fields in a data fields channel; and a plurality of programmable structures in sequence with one another along the data fields channel, wherein, for each programmable structure of the plurality of programmable structures:

the programmable structure to receive a respective set of frame header fields of the data fields channel, the programmable structure including:

key selection logic to dynamically select a key from the respective set of frame header fields;

a ternary content addressable memory (TCAM), wherein the programmable structure to perform an associative lookup of the TCAM based on the key to determine an index;

an action table comprising a plurality of configurable profiles each including an input field, a mask field, an operation field, and an output field, wherein the programmable structure to select, based on the index, a first profile of the plurality of configurable profiles;

the programmable structure to generate a first operand in response to selection of the first profile, including:

the programmable structure to dynamically select, based on the input field of the first profile, input data from the respective set of frame header fields; and the programmable structure to mask a portion of the input data based on the mask field of the first profile;

the programmable structure to perform with the first operand a first operation according to the operation field of the first profile, and the programmable structure to transform data in the data fields channel based on a result of the operation and according to the output field of the first profile.

11. The switch fabric of claim 10, wherein for each programmable structure of the plurality of programmable structures:

the programmable structure to transform data in the data fields channel based on the result of the operation and according to the output field of the profile includes the programmable structure to multiplex the result of the operation into the data fields channel according to the output field of the profile.

12. The switch fabric of claim 10, further comprising:
   multiplexor stages to receive profile indices from the plurality of programmable structures and to perform multiplex operations based on the profile indices, including the multiplexor stages to multiplex into the data field channel a result of a lookup operation performed by the plurality of programmable structures.

* * * * *